(12) United States Patent
Nakayama et al.

(10) Patent No.: US 9,893,340 B2
(45) Date of Patent: Feb. 13, 2018

(54) BATTERY WIRING MODULE

(71) Applicants: AUTONETWORKS TECHNOLOGIES, LTD., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Osamu Nakayama, Mie (JP); Mitsutoshi Morita, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 165 days.

(21) Appl. No.: 14/419,943

(22) PCT Filed: Aug. 1, 2013

(86) PCT No.: PCT/JP2013/070839
§ 371 (c)(1),
(2) Date: Feb. 6, 2015

(87) PCT Pub. No.: WO2014/024760
PCT Pub. Date: Feb. 13, 2014

(65) Prior Publication Data
US 2015/0228955 A1 Aug. 13, 2015

(30) Foreign Application Priority Data
Aug. 10, 2012 (JP) .................................. 2012-177934

(51) Int. Cl.
*H01M 2/20* (2006.01)
*H01M 2/34* (2006.01)
(Continued)

(52) U.S. Cl.
CPC ............ *H01M 2/206* (2013.01); *H01G 11/82* (2013.01); *H01M 2/043* (2013.01); *H01M 2/305* (2013.01);
(Continued)

(58) Field of Classification Search
CPC ...... H01M 2/202; H01M 2/206; H01M 2/204; H01M 2/06; H01M 2/22; H01M 2/1077;
(Continued)

(56) References Cited

U.S. PATENT DOCUMENTS 4,664,994 A * 5/1987 Koike .................... H01M 2/021
429/163
5,293,951 A * 3/1994 Scott ....................... B60R 16/04
180/68.5
(Continued)

FOREIGN PATENT DOCUMENTS

EP 0603872 A2 6/1994
EP 2105997 A2 9/2009
(Continued)

OTHER PUBLICATIONS

Jun. 1, 2015 Search Report issued in European Patent Application No. 13827314.9.
(Continued)

*Primary Examiner* — Eric R Smith
(74) *Attorney, Agent, or Firm* — Oliff PLC

(57) ABSTRACT

A battery wiring module may include connecting members for connecting adjacent electrode terminals to each other, an external connection terminal that is connectable to another device, and a resin protector having holding portions that
(Continued)

hold the connecting members and the external connection terminal. A lid portion for covering the external connection terminal may be provided integrally with the resin protector via a first hinge. The lid portion may be provided with a second hinge having a hinge axis that is orthogonal to a hinge axis of the first hinge. A first lid portion that is formed by folding the first hinge and a second lid portion that is formed by folding the second hinge can be disposed in directions crossing each other.

9 Claims, 10 Drawing Sheets

(51) Int. Cl.
H01M 2/04 (2006.01)
H01M 2/30 (2006.01)
H01M 10/04 (2006.01)
H01M 10/42 (2006.01)
H01G 11/82 (2013.01)

(52) U.S. Cl.
CPC ......... *H01M 2/34* (2013.01); *H01M 10/0431* (2013.01); *H01M 10/425* (2013.01); *H01M 2220/20* (2013.01); *Y02E 60/13* (2013.01); *Y02T 10/7022* (2013.01)

(58) Field of Classification Search
CPC .. H01M 2/04–2/0495; H01M 2220/20; H01M 10/42; H01M 10/4207; H01M 10/425; H01M 10/44–10/448; H01G 11/82; B66F 9/07527; B66F 9/0753; B66F 9/07536; H02G 3/081; H02G 3/083; H02G 3/085; H02G 3/14
USPC ...................................................... 180/68.5
See application file for complete search history.

(56) References Cited

U.S. PATENT DOCUMENTS

| 5,439,759 | A | * | 8/1995 | Lippert | H01M 2/32 174/138 F |
| 5,576,516 | A | * | 11/1996 | Kameyama | H01M 2/32 174/138 F |
| 5,585,205 | A | * | 12/1996 | Kohchi | B60K 1/04 180/65.1 |
| 5,804,770 | A | | 9/1998 | Tanaka | |
| 6,261,719 | B1 | | 7/2001 | Ikeda et al. | |
| 6,312,851 | B1 | * | 11/2001 | Fukuda | H01M 2/0242 429/120 |
| 6,379,837 | B1 | * | 4/2002 | Takahashi | H01M 2/08 429/120 |
| 6,494,279 | B1 | * | 12/2002 | Hutchens | B60K 1/04 180/65.1 |
| 2011/0223466 | A1 | | 9/2011 | Lee et al. | |

FOREIGN PATENT DOCUMENTS

| JP | H09-92353 A | 4/1997 |
| JP | H09-106802 A | 4/1997 |
| JP | 2000-149909 A | 5/2000 |
| JP | 2004-071168 A | 3/2004 |
| JP | 2008-166008 A | 7/2008 |
| JP | 2011-008955 A | 1/2011 |
| JP | 2011-081913 A | 4/2011 |
| JP | 2012-512516 A | 5/2012 |
| JP | 2012-169256 A | 9/2012 |
| JP | 2012-256538 A | 12/2012 |

OTHER PUBLICATIONS

Sep. 10, 2013 International Search Report issued in International Patent Application No. PCT/JP2013/070839.

* cited by examiner

BATTERY WIRING MODULE

CROSS-REFERENCE TO RELATED APPLICATIONS

This application claims priority to International Application No. PCT/JP2013/070839 filed on Aug. 1, 2013, and to Japanese Patent Publication JP 2012-177934, filed on Aug. 10, 2012, the disclosures of both of which are incorporated herein by reference in their entireties.

TECHNICAL FIELD

Embodiments of the present application relate to a battery wiring module.

BACKGROUND

Battery modules for installation in, for example, electric cars or hybrid vehicles are generally configured by connecting multiple single cells in series via a bus bar.

As an example of such battery modules, a battery module is assembled by attaching a battery wiring module including bus bars and a wire group to a single cell group configured by lining up a plurality of single cells. See JP 2011-8955A The battery wiring module disclosed in JP 2011-8955A includes a plurality of bus bars that are held in predetermined positions in a resin protector and a plurality of wires (wire group) that are accommodated in a wire accommodation groove provided in the resin protector.

SUMMARY

Battery wiring modules can have the functions of connecting a plurality of single cells and also supplying a power source to other external devices, for example, and are often equipped with an external connection terminal that is connectable to the other devices to supply the power source thereto.

Since it is feared that a direct contact with this external connection terminal may cause an electric shock, a battery wiring module may be provided with a member for covering the external connection terminal to secure insulation.

Although it is conceivable to form the member for covering the external connection terminal as a member that is separate from the resin protector, the need for an operation of attaching this separate member to the resin protector causes the problems of poor operability and an increase in the number of components. To avoid these problems, the resin protector and the member for covering the external connection terminal can be integrated into a single unit.

Furthermore, since a connecting operation for electrically connecting the external connection terminal to another device etc. is performed, the member for covering the external connection terminal may not only have the function of covering the terminal but may also have a structure that is operable to uncover the terminal.

To attain the structure that is operable to uncover the external connection terminal, it is conceivable to move a portion that covers the terminal by operating a hinge. However, depending on the shape of the resin protector, there are cases where the hinge cannot be provided in a favorable position in terms of the operability due to restrictions in shaping of the resin protector.

If the member for covering the external connection terminal has a shape that cannot be formed by simply separating a fixed side and a movable side of a mold from each other in a straight direction during molding of the resin protector, a slide mold is needed, and thus the cost increases.

Embodiments of the present application were made in view of the circumferences as described above, and it is an object thereof to provide a battery wiring module including a resin protector having an openable/closable member that has excellent operability while reducing the cost.

In order to solve the above-described problems, embodiments of the present application may include a battery wiring module to be attached to a single cell group in which a plurality of single cells having cathode and anode electrode terminals are lined up, the battery wiring module including connecting members for connecting adjacent electrode terminals to each other, an external connection terminal that is connectable to another device, and a resin protector having holding portions that hold the connecting members and the external connection terminal, wherein a lid portion for covering the external connection terminal is provided integrally with the resin protector via a first hinge, the lid portion is provided with a second hinge having a hinge axis that is orthogonal to a hinge axis of the first hinge, and a first lid portion that is formed by folding the first hinge and a second lid portion that is formed by folding the second hinge are configured to be disposed in directions crossing each other.

If the lid portion of the external connection terminal has a shape that cannot be formed by simply separating a fixed side and a movable side of a mold from each other in a straight direction during molding of the resin protector, a slide mold is needed, or it is necessary to form the lid portion as a member that is separate from the resin protector.

According to embodiments of the present application, since the lid portion for covering the external connection terminal is provided integrally with the resin protector via the first hinge, the resin protector and the lid portion are integral with each other.

Also, according to embodiments of the present application, the lid portion is provided with the second hinge having the hinge axis that is orthogonal to the hinge axis of the first hinge. Since the second lid portion that is disposed in the direction crossing the first lid portion that is formed by folding the first hinge is configured to be formed by folding the second hinge, when the first hinge and the second hinge are not folded, the releasing direction of the shaping mold can be a single direction (e.g., see FIG. 1). Therefore, according to embodiments of the present application, a slide mold is not needed.

Furthermore, according to embodiments of the present application, since the first lid portion and the second lid portion that is disposed in the direction crossing the first lid portion are formed by forming the first lid portion by folding the first hinge, and subsequently forming the second lid portion by folding the second hinge, the state in which the lid portion is closed can be attained by folding the first hinge and the second hinge one after the other. Also, the operation for opening the lid portion can be performed by returning this state to a state before at least the second hinge is folded. Therefore, excellent operability is also achieved.

Thus, according to embodiments of the present application, it is possible to provide a battery wiring module including a resin protector having an openable/closable member that has excellent operability while reducing the cost.

Embodiments of the present application may also have the following configurations.

The resin protector may also be provided with a locking structure that holds the lid portion in a state in which the first hinge is folded.

With this configuration, the lid portion can be held in the state in which the first hinge is folded, and accordingly the operability can be improved even more.

A configuration may also be adopted in which the holding portion of the resin protector that holds the external connection terminal is provided with a holding wall surrounding the external connection terminal, and the first lid portion that is formed by folding the first hinge in a direction toward an outer side of the holding portion is configured to be locked on an outer side surface of the holding wall that is on the opposite side to the side of the external connection terminal.

With this configuration, the first lid portion is fixed by locking the first lid portion that is formed by folding the first hinge in the direction toward the outer side of the holding portion on the outer side surface of the holding wall, the lid portion can be closed such that the external connection terminal is covered with the second lid portion by folding the second hinge, and the lid portion can be opened by returning the second hinge to its original position. Consequently, according to the above-described configuration, the operability of the operation for opening/closing the lid portion can be improved.

Additionally, according to embodiments of the present application, it is possible to provide a battery wiring module including a resin protector having an openable/closable member that has excellent operability while reducing the cost.

DESCRIPTION OF EMBODIMENTS

Embodiment 1

Figure 1:
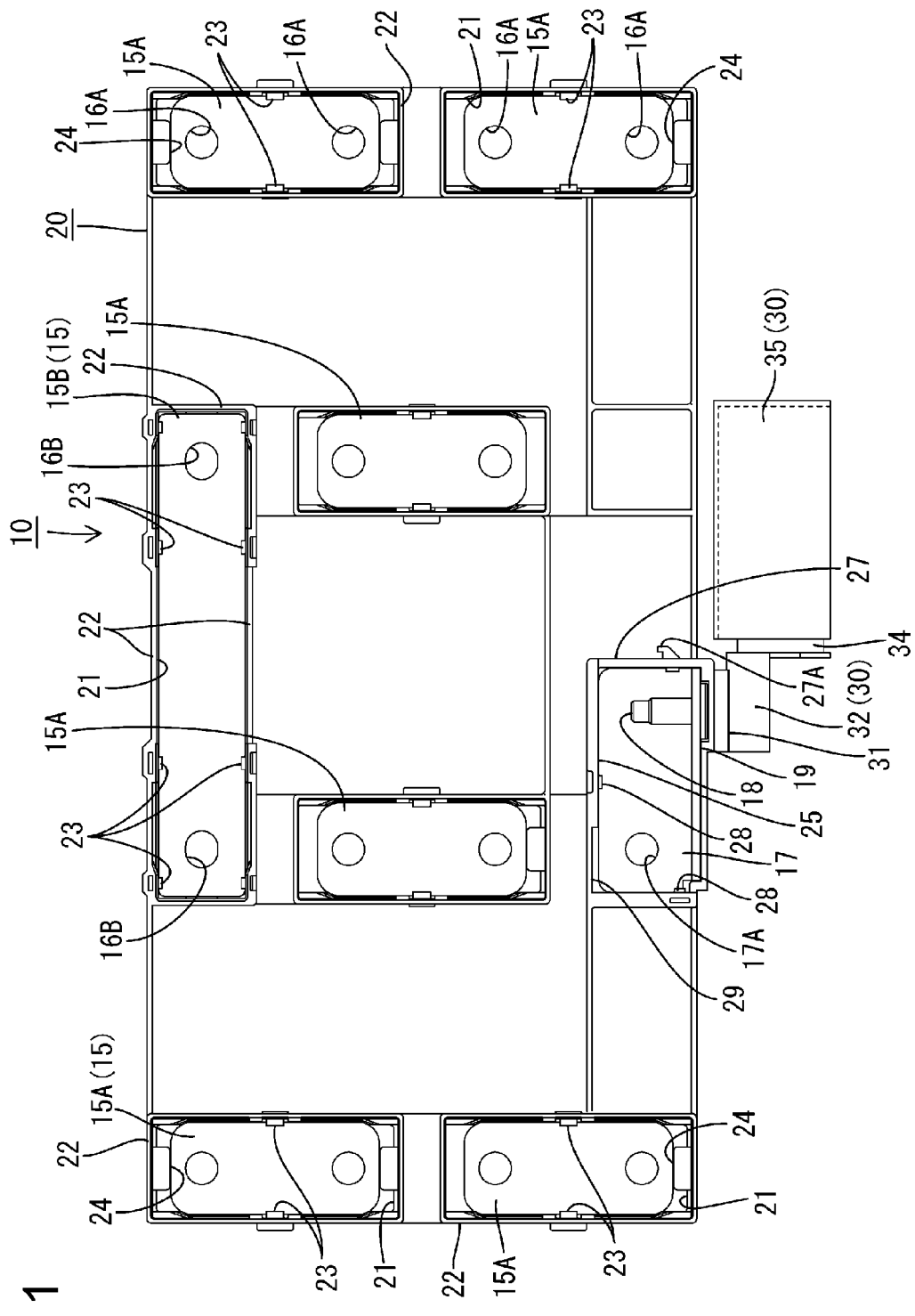
FIG. 1 is a plan view of a battery wiring module according to Embodiment 1.

Embodiment 1 of the present application will be described using FIGS. 1 to 10.

A battery wiring module 10 of this embodiment connects, by means of bus bars 15 (an example of connecting members), adjacent electrode terminals 13 of a plurality of single cells 11 that are lined up in a row. A battery module (not shown) to which this battery wiring module 10 is attached may be used as, for example, a driving source of a vehicle such as an electric car, a hybrid car, or the like.

Battery Module

The battery module includes a single cell group 12 configured by lining up, for example, eight (a plurality of) single cells 11 and the battery wiring module 10 that connects the eight single cells 11.

Single Cells 11

Figure 2:
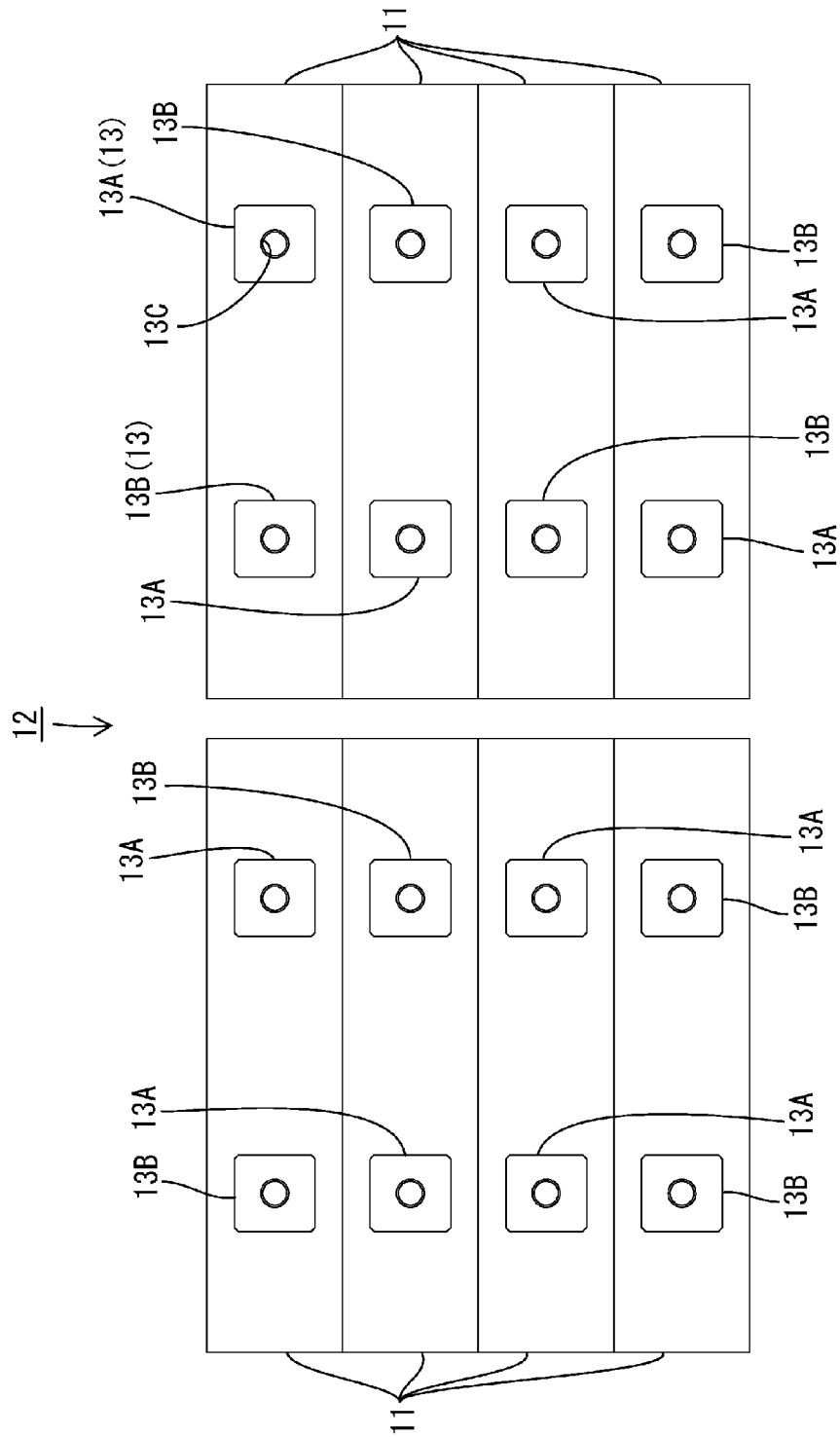
FIG. 2 is a plan view of a battery module to which the battery wiring module is to be attached.

As shown in FIG. 2, each single cell 11 has a flat, rectangular parallelepiped-shaped main body in which a power-generating element, which is not shown, is contained, and a pair of electrode terminals 13 vertically protruding from an upper surface of the main body. Each pair of electrode terminals 13 consists of a cathode terminal 13A and an anode terminal 13B that are arranged in a direction from left to right.

Each of the electrode terminals 13 is an angular tube-shaped nut (square nut), and provided with a circular screw hole 13C that passes through the center thereof. The bus bars 15, which will be described later, and a voltage detection terminal (not shown) are fixed by screwing shaft portions (not shown) of bolts into the screw holes 13C of these electrode terminals 13.

The single cells 11 are arranged in such orientations that adjacent electrode terminals 13 have opposite polarities. The single cell group 12 constituted by the plurality of single cells 11 is fixed by a holding plate, which is not shown.

The eight single cells 11 are divided into two rows (a plurality of rows) in a direction in which the long side of the upper surfaces of the single cells 11 extends, and stacked on top of one another in four layers (a plurality of layers) in a direction in which the short side of the upper surfaces of the single cells 11 extends.

Battery Wiring Module 10

As shown in FIG. 1, the battery wiring module 10 has seven (a plurality of) bus bars 15 (an example of the connecting members), the bus bars 15 each connecting adjacent electrode terminals 13A and 13B of different single cells 11, an external connection bus bar 17 that is connected to the electrode terminal 13 at an end portion of the single cells 11 and includes an external connection terminal 18 that is electrically connectable to an external device, and a resin protector 20 that holds the bus bars 15 and the external connection bus bar 17.

Bus Bars 15

The bus bars 15 are made of a metal such as, for example, copper, a copper alloy, stainless steel (SUS), aluminum, or the like. In this embodiment, the bus bars 15 include two types of bus bars 15A and 15B having different dimensions in a longitudinal direction. More specifically, the bus bars 15 include six bus bars 15A (short bus bars 15A) that have small dimensions in the longitudinal direction and connect adjacent electrode terminals 13A and 13B of different single cells 11 in a front-rear direction (direction in which the short side of the upper surfaces of the single cells 11 extends), and one long bus bar 15B that is formed to be longer (have a larger dimension in the longitudinal direction) than the short bus bars 15A and connect adjacent electrode terminals 13A and 13B of different single cells 11 in the left-right direction (direction in which the long side of the upper surfaces of the single cells 11 extends).

The short bus bars 15A have a plate-like shape whose length corresponds to the distance between electrode terminals 13A and 13B that are adjacent to each other in the front-rear direction, and each of the bus bars 15A is provided with a pair of circular insertion holes 16A which pass through the bus bar 15A and into which shaft portions of bolts are inserted.

The long bus bar 15B has a plate-like shape whose length corresponds to the distance between the electrode terminals 13A and 13B that are adjacent to each other in the left-right direction, and a pair of insertion holes 16B which pass through the long bus bar 15B and into which shaft portions of bolts are inserted are formed on left and right end sides of the long bus bar 15B. The insertion holes 16B have an elliptical shape whose major axis extends in the left-right direction (connecting direction).

External Connection Bus Bar 17

The external connection bus bar 17 is made of a metal such as, for example, copper, a copper alloy, stainless steel (SUS), aluminum, or the like. As shown in FIG. 1, the external connection bus bar 17 is an external connection portion that is connected to the electrode terminal 13 at an end portion of the series connection of the single cells 11 on one end side and is provided with the bolt-shaped external connection terminal 18 that is connectable to an external device on the other end side. The external connection terminal 18 is electrically connectable to an external device (another device) such as an inverter.

An insertion hole 17A is formed in one end portion of the external connection bus bar 17 that is connected to the electrode terminal 13 of the single cell 11. The external connection portion of the external connection bus bar 17 includes, as shown in FIG. 1, a raised wall 19 extending substantially vertically upward from one side edge of a pair of side edges of the external connection bus bar 17 that extend in the longitudinal direction, and the external connection terminal 18 perpendicularly protruding from a central portion of the raised wall 19. The external connection terminal 18 has a cylindrical shape and is electrically connectable to an external device such as an inverter or another battery module (an example of the other device).

Resin Protector 20

The resin protector 20 is made of a synthetic resin and includes first holding portions 21 (an example of holding portions that hold the connecting members) that hold the bus bars 15 and a second holding portion 25 (an example of a holding portion that holds the external connection terminal) that holds the external connection bus bar 17.

The first holding portions 21 are provided such that the lengths thereof correspond to the lengths of the bus bars 15A and 15B, respectively, and each have an angular tube-shaped partition wall 22 surrounding the bus bar 15A or 15B that is placed on a bottom plate, and a plurality of disengagement restraining pieces 23 that restrain the bus bar 15A or 15B from disengaging from the first holding portion 21.

Openings (not shown) where the bottom plate is not provided are formed at the positions of the electrode terminals 13. The partition walls 22 are formed to have a height that can prevent a tool etc. from coming into contact with the electrode terminals 13 and the bus bars 15A and 15B and causing a short-circuit.

A positioning portion 24 is provided on an end portion side of each of the partition walls 22 in the connecting direction of the bus bars 15A, the positioning portion 24 positioning the short bus bar 15A in the connecting direction.

The positioning portion 24 protrudes horizontally inward from an inner surface of the partition wall 22 at substantially the same level as the level of the bus bar 15A and abuts against the bus bar 15A.

The disengagement restraining pieces 23 are configured to be capable of bending deformation by providing U-shaped cut-outs in the partition walls 22, and are formed such that the thicknesses thereof gradually increase toward a lower end side The bus bar 15 is disposed under the disengagement restraining pieces 23, and thus disengagement of the bus bar 15 is restrained.

The second holding portion 25 is, as shown in FIG. 1, provided such that the length thereof corresponds to the shape of the external connection bus bar 17, and has a bottom plate 26 on which the external connection bus bar 17 is placed, a holding wall 27 surrounding the external connection bus bar 17, and a plurality of disengagement restraining pieces 28 that restrain the external connection bus bar 17 from disengaging from the second holding portion 25.

In a region of the second holding portion 25 where the end portion of the external connection bus bar 17 in which the insertion hole 17A is formed is placed, an opening 29 in which the bottom plate 26 is not provided is formed.

The holding wall 27 is formed to have a height that can prevent a tool etc. from coming into contact with the electrode terminal 13 and the external connection bus bar 17 and causing a short-circuit, and an end portion on the side of the raised wall 19 (the side to which a conductive member of the other device is connectable) is open without being closed by the holding wall 27. The disengagement restraining pieces 28 have the same configuration as those of the first holding portion 21.

Figure 4:
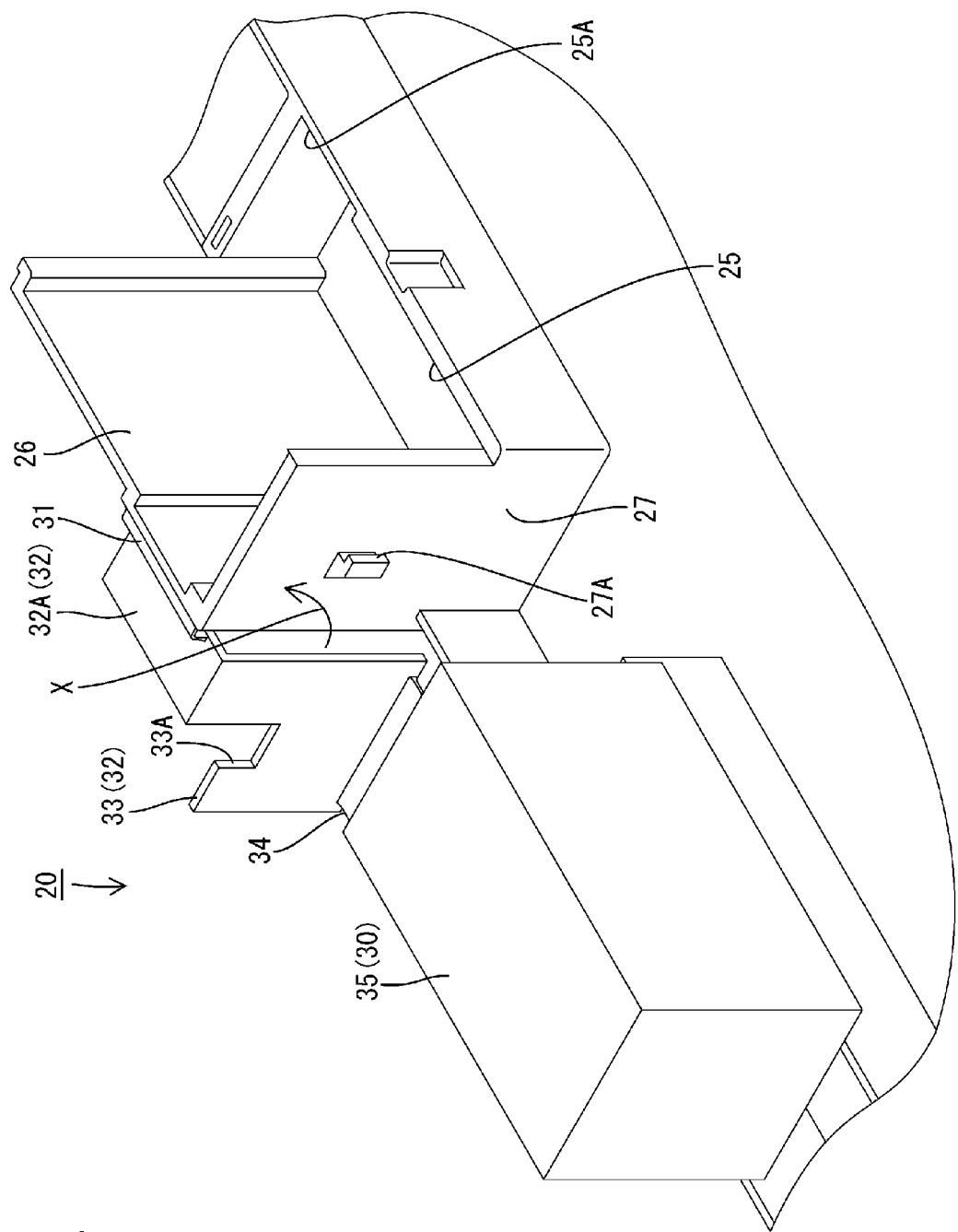
FIG. 4 is a perspective view of the relevant portion in the state shown in FIG. 1.

As shown in FIGS. 1 and 4, a locking protruding portion 27A is formed protruding outward from an outer side surface of a right side portion of the holding wall 27 in FIG. 1 of a pair of side portions of the holding wall 27 that extend in the short-side direction (direction in which the external connection terminal 18 protrudes). Also, a first hinge 31 is connected to an edge portion of the bottom plate 26 of the second holding portion 25.

Now, in this embodiment, a lid portion 30 for covering the external connection bus bar 17 (external connection terminal 18) is provided integrally with the resin protector 20 via the first hinge 31. The lid portion 30 includes a first lid portion 32 that is connected to the bottom plate 26 via the first hinge 31, a second hinge 34 having a hinge axis that is orthogonal to a hinge axis of the first hinge 31, and a second lid portion 35 that is connected to the first lid portion 32 via the second hinge 34.

Figure 3:
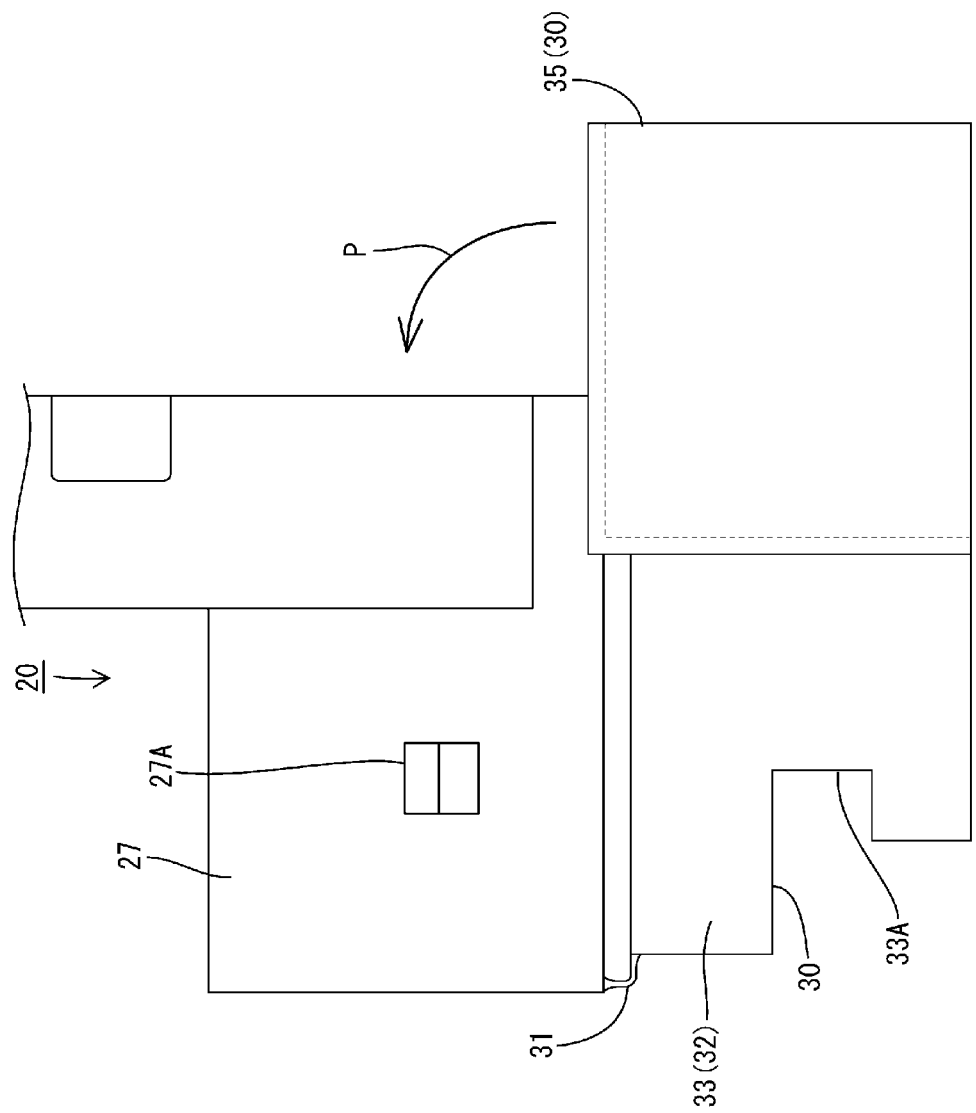
FIG. 3 is a side view of a relevant portion in a state shown in FIG. 1.

As shown in FIGS. 3 and 4, the first lid portion 32 is constituted by a substantially oblong rectangular portion 32A that is connected to the first hinge 31, and a locking plate portion 33 that is disposed substantially perpendicularly to the rectangular portion 32A and has an L-shaped cut-out 33A that can be locked by the locking protruding portion 27A, which is provided on the holding wall 27. The L-shaped cut-out 33A serves as the locked portion 33A to be locked by the locking protruding portion 27A. The second hinge 34 is formed on a side edge (side edge on the lower side in FIG. 4) of the locking plate portion 33 that is on the opposite side to the side edge in which the locked portion 33A is formed.

Figure 7:
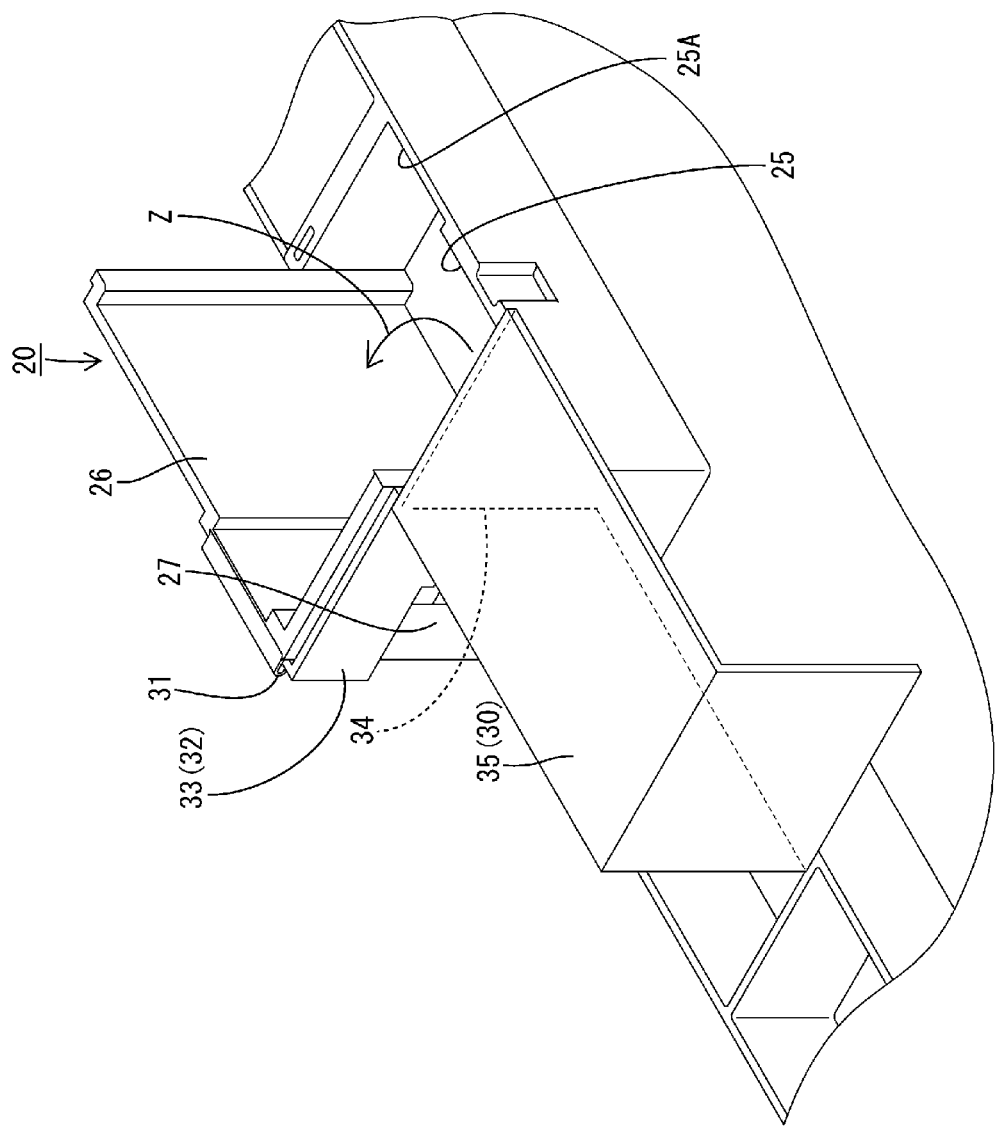
FIG. 7 is a perspective view of the relevant portion in the state shown in FIG. 5.

The second lid portion 35 has a substantially rectangular parallelepiped shape as shown in FIG. 4, and the front side, the lower side, and the right side thereof in FIG. 7 are open. It should be noted that in FIGS. 4, 7, and 10, which are diagrams for explaining the opening/closing operation of the lid portion 30, only a relevant portion of the lid portion 30 is shown, and the external connection bus bar 17 is omitted.

The resin protector 20 and the lid portion 30 of this embodiment can be integrally shaped by releasing a mold in a direction that is parallel to the direction perpendicular to the paper plane in FIG. 1, and a slide mold is not needed.

Next, a method for attaching the battery wiring module 10 will be described.

The bus bars 15A and 15B are placed on the bottom plate of the first holding portion 21 of the resin protector 20 and contained and held therein. Also, the external connection bus bar 17 is placed on the bottom plate 26 of the second holding portion 25 and contained and held therein. At this time, when the bus bars 15A and 15B and the external connection bus bar 17 are fitted into the respective holding portions from above, the disengagement restraining pieces 23 and 28 are bent and deformed, and when the bus bars 15A and 15B and the external connection bus bar 17 reach under the disengagement restraining pieces 23 and 28, the disengagement restraining pieces 23 and 28 elastically return, so that the bus bars 15A and 15B and the external connection bus bar 17 are held so as not to disengage from the respective holding portions 21 and 25.

Next, an opening portion 25A of the second holding portion 25 is covered with the lid portion 30, thereby covering the external connection terminal 18, which is held in the second holding portion 25, with the lid portion 30. In the state (state before the first hinge 31 and the second hinge 34 are folded) shown in FIG. 1, an upper portion of the second holding portion 25 is open.

The first lid portion 32 is rotated about 90° in a direction indicated by arrow X in FIG. 4 (arrow P in FIG. 3) by folding the first hinge 31 in a direction toward an outer side of the second holding portion 25. Then, the rectangular portion 32A of the first lid portion 32 is disposed on the outer side of the bottom plate 26 of the second holding portion 25, and the locking plate portion 33 is disposed in a position at which it overlaps the outer side surface of the holding wall 27 of the second holding portion 25. Thus, the locked portion 33A of the locking plate portion 33 is locked by the locking protruding portion 27A that is formed on that outer side surface of the holding wall 27.

Figure 5:
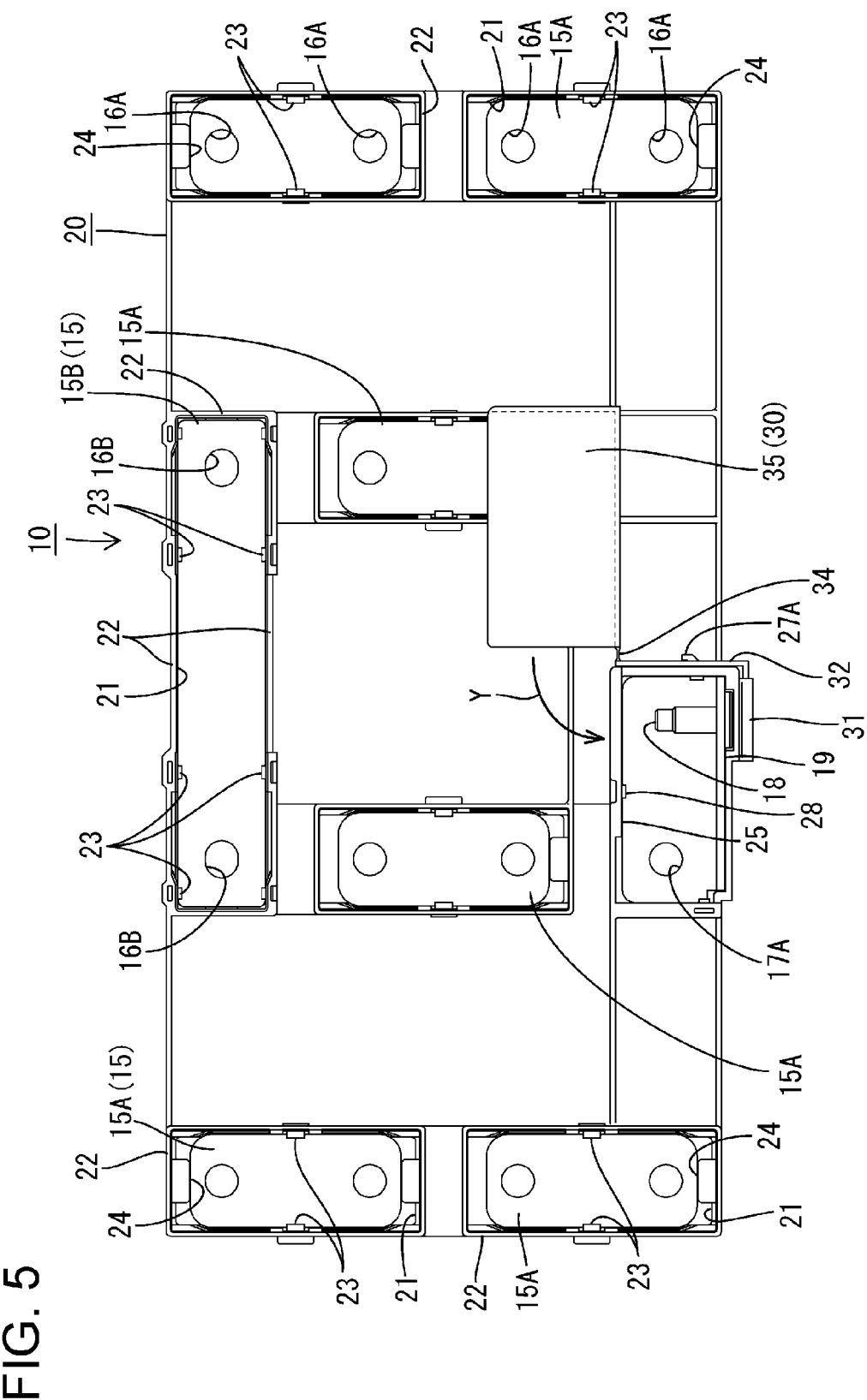
FIG. 5 is a plan view of the battery wiring module in a state in which a first hinge is folded.
Figure 6:
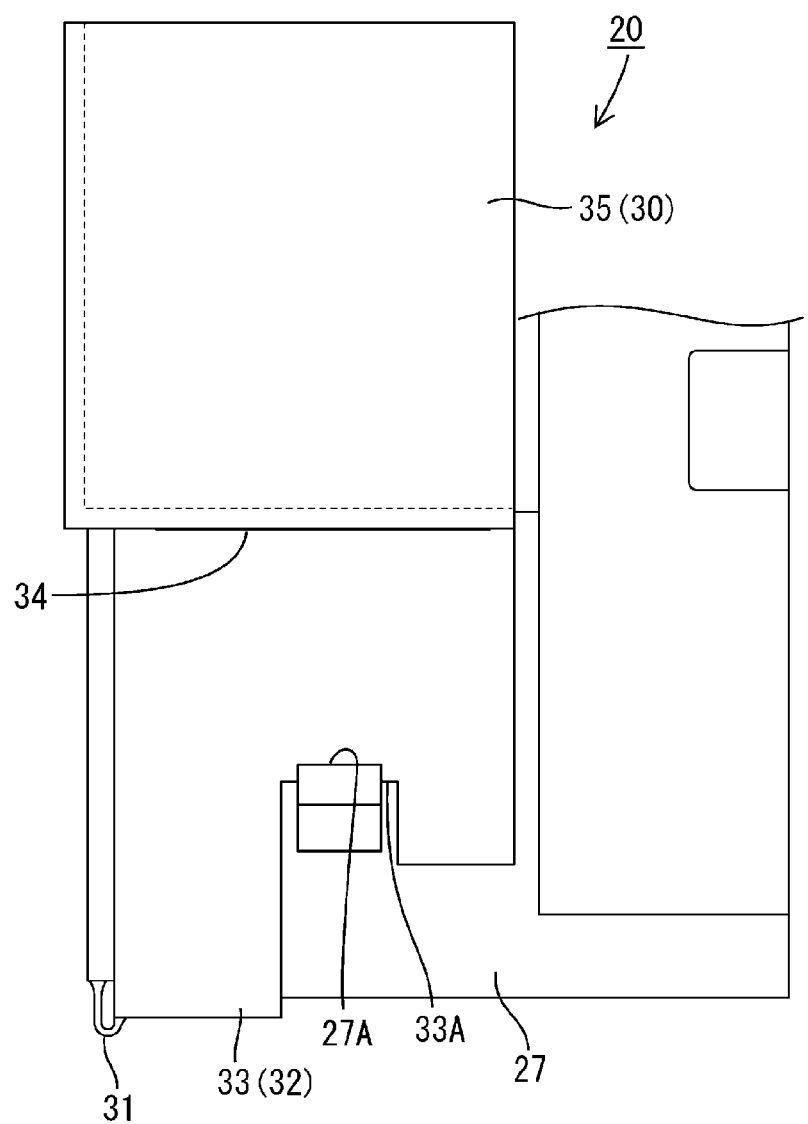
FIG. 6 is a side view of the relevant portion in a state shown in FIG. 5.

When the locking plate portion 33 is locked by the locking protruding portion 27A on the holding wall 27, as shown in FIGS. 5 to 7, the first lid portion 32 itself is locked on the holding wall 27. At this time, the second lid portion 35 is disposed on the upper side in FIGS. 5 and 6.

Figure 8:
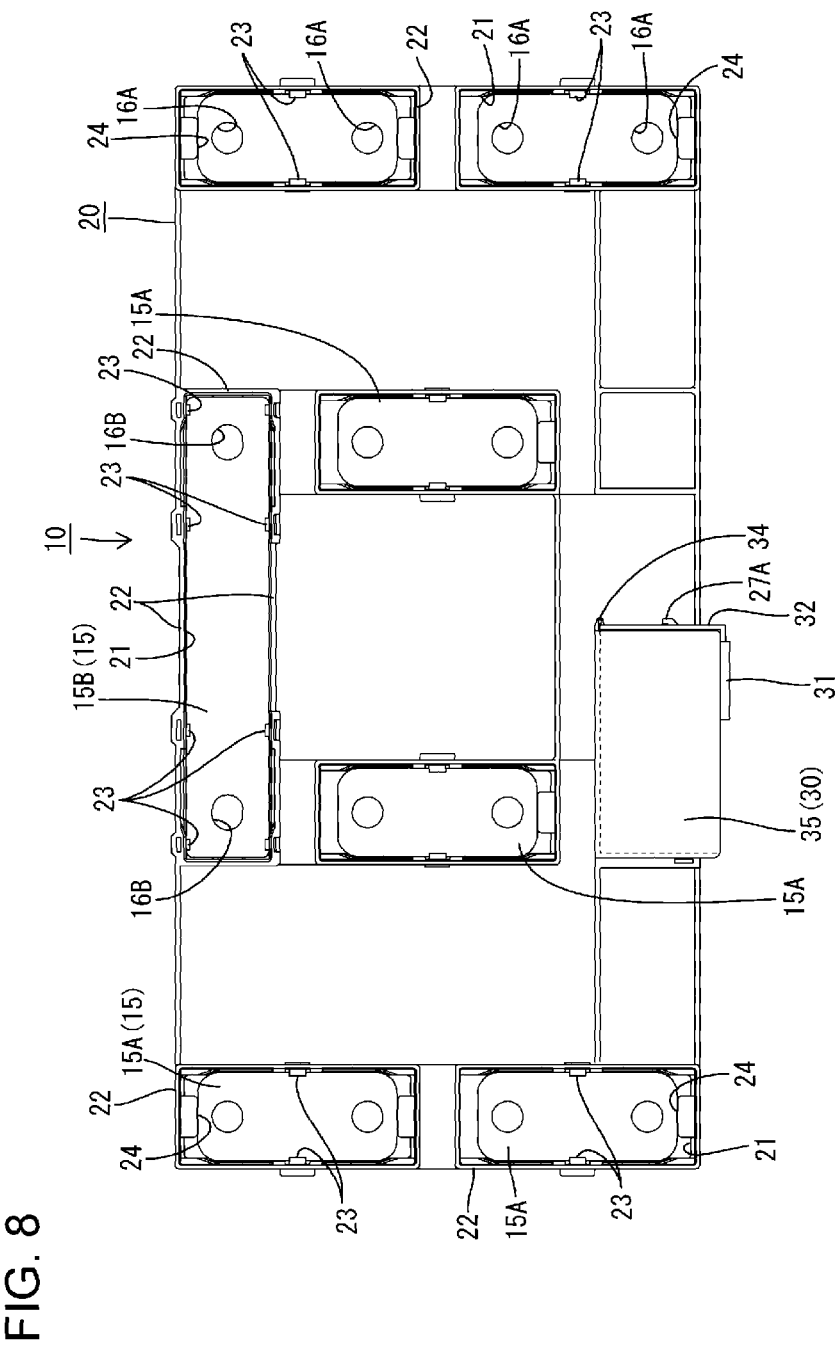
FIG. 8 is a plan view of the battery wiring module in a state in which the first hinge and a second hinge are folded.
Figure 9:
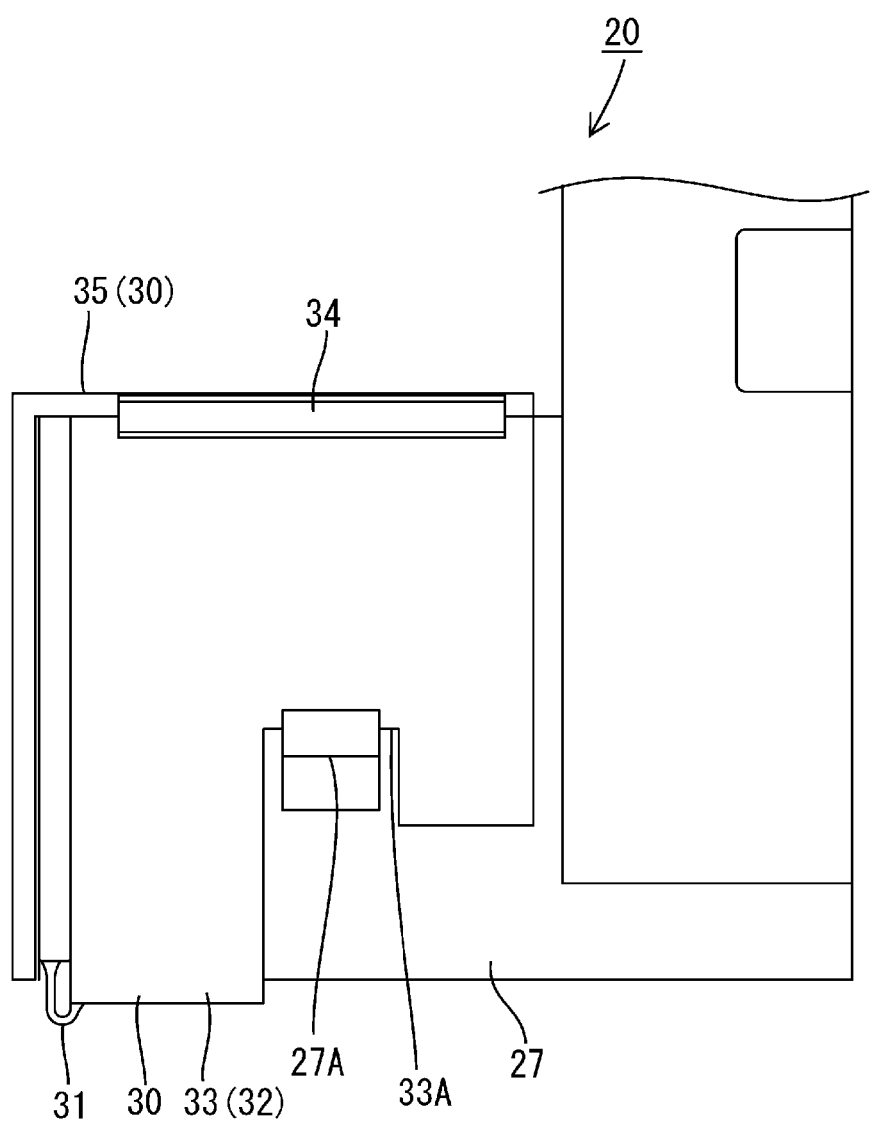
FIG. 9 is a side view of the relevant portion in a state shown in FIG. 8.
Figure 10:
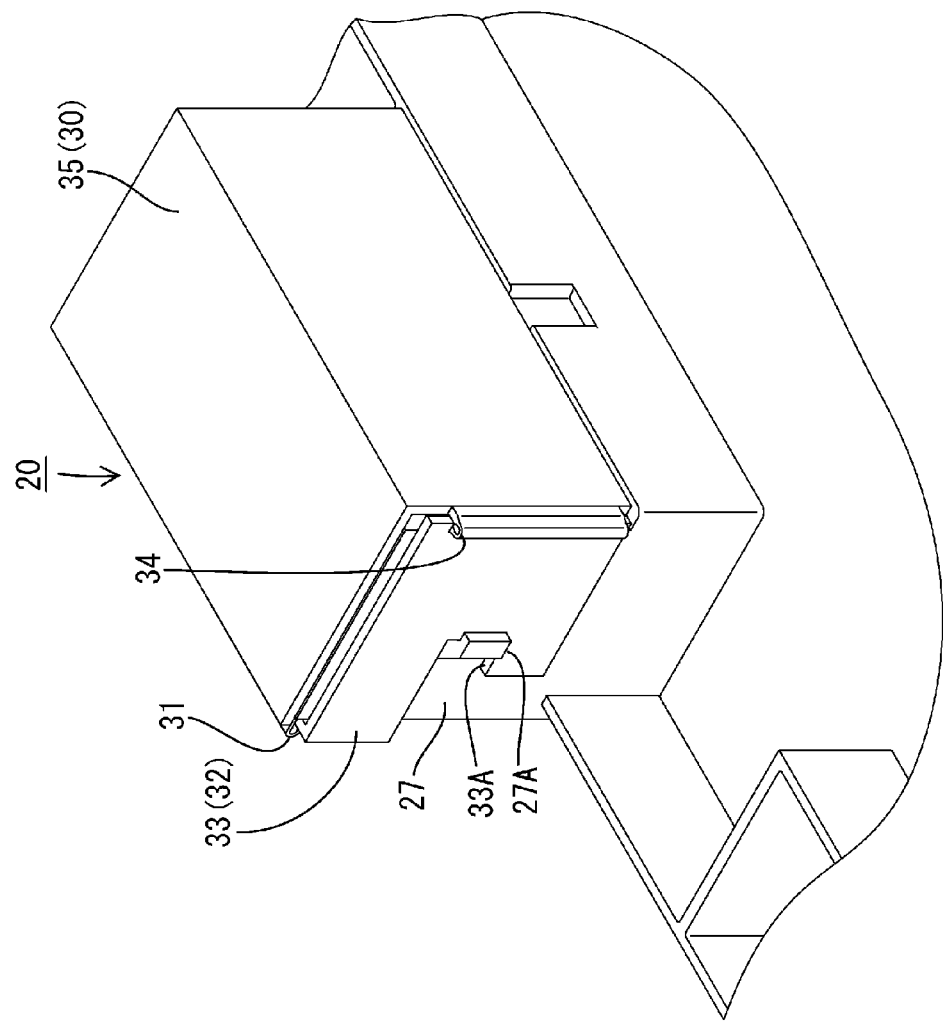
FIG. 10 is a perspective view of the relevant portion in the state shown in FIG. 8.

Next, when the second lid portion 35 is rotated 180° by folding the second hinge 34 in a direction indicated by arrow Y in FIG. 5 (arrow Z in FIG. 7), as shown in FIGS. 8 to 10, the opening portion 25A of the second holding portion 25 is covered with the second lid portion 35, so that the external connection terminal 18 is covered with the lid portion 30.

Next, a voltage detection terminal to which a voltage detection wire is connected, a thermistor, or the like is connected as necessary, and the battery wiring module 10 is thus formed.

Next, the external connection terminal 18 is connected to another device. First, when the second hinge 34 in the folded state is returned to the state before folding (state as shown in FIGS. 5 to 7), the lid portion 30 is in an opened state with the first lid portion 32 being held by the holding wall 27, and thus the operation for connecting the external connection terminal 18 to another device can be performed.

When the operation for connecting the external connection terminal 18 to the other device ends, the battery wiring module 10 is mounted to the single cell group 12 in which the single cells are arranged as shown in FIG. 2 and bolted thereto by inserting the shaft portions of the bolts, which are not shown, into the respective insertion holes 16A and 16B of the bus bars 15A and 15B. When the attachment of the battery wiring module 10 to the single cell group 12 is finished, a battery module is obtained.

According to this embodiment, the following effects are achieved.

In this embodiment, since the lid portion 30 for covering the external connection terminal 18 is provided integrally with the resin protector 20 via the first hinge 31, the resin protector 20 and the lid portion 30 are integral with each other.

Also, in this embodiment, the lid portion 30 is provided with the second hinge 34 having the hinge axis that is orthogonal to the hinge axis of the first hinge 31. Since the second lid portion 35 that is disposed in a direction crossing the first lid portion 32 that is formed by folding the first hinge 31 is configured to be formed by folding this second hinge 34, when the first hinge 31 and the second hinge 34 are not folded, the releasing direction of the shaping mold can be a single direction, and therefore a slide mold is not needed.

Furthermore, in this embodiment, since the first lid portion 32 and the second lid portion 35 that is disposed in the direction crossing the first lid portion 32 are formed by forming the first lid portion 32 by folding the first hinge 31, and subsequently forming the second lid portion 35 by folding the second hinge 34, the state in which the lid portion 30 is closed can be attained by folding the first hinge 31 and the second hinge 34 one after the other. In addition, the operation of opening the lid portion 30 can be performed by returning this state to the state before the second hinge 34 is folded. Therefore, the operability is also excellent.

Thus, according to this embodiment, it is possible to provide the battery wiring module 10 including the resin protector 20 having the openable/closable member that has excellent operability while reducing the cost.

Also, according to this embodiment, since a locking structure that holds the lid portion 30 in a state in which the first hinge 31 is folded is provided, the lid portion 30 can be held in the state in which the first hinge 31 is folded, and accordingly the operability can be improved even more.

In particular, in this embodiment, the second holding portion 25 that holds the external connection terminal 18 is provided with the holding wall 27 surrounding the external connection terminal 18, and the first lid portion 32 that is formed by folding the first hinge 31 in the direction toward the outer side of the holding portion is configured to be locked on the outer side surface of the holding wall 27 that is on the opposite side to the side of the external connection terminal 18.

Therefore, according to this embodiment, the first lid portion 32 is fixed by locking the first lid portion 32 that is formed by folding the first hinge 31 in the direction toward the outer side of the second holding portion 25 on the outer side surface of the holding wall 27, the lid portion 30 can be closed such that the external connection terminal 18 is covered with the second lid portion 35 by folding the second hinge 34, and the lid portion 30 can be opened by returning the second hinge 34 to its original position. Thus, the operability of the operation for opening/closing the lid portion 30 can be improved.

Other Embodiments

Embodiments of the present application are not limited to the foregoing description and the embodiment that has been described using the drawings, and, for example, embodiments as described below are also embraced within the technical scope of the present application.

(1) In the foregoing embodiment, an example in which the first lid portion 32 is formed by folding the first hinge 31 in the direction toward the outer side of the second holding portion 25 has been described. However, a configuration may also be adopted in which the first lid portion is formed by folding the first hinge in a direction toward an inner side of the holding portion.

(2) In the foregoing embodiment, a configuration in which the locking structure that holds the lid portion 30 in the state in which the first hinge 31 is folded has been described. However, a configuration without a structure that locks the lid portion may also be adopted.

(3) In the foregoing embodiment, a configuration in which the two hinges 31 and 34 are provided has been described. However, a configuration with three or more hinges may also be adopted.

LIST OF REFERENCE NUMERALS

10 Battery wiring module
11 Single cell
12 Single cell group
13 Electrode terminal
13A Cathode terminal
13B Anode terminal
15 Bus bar (connecting member)
15A Short bus bar
15B Long bus bar
17 External connection bus bar
18 External connection terminal
20 Resin protector
21 First holding portion (holding portion that holds connecting member)
25 Second holding portion (holding portion that holds external connection terminal)
26 Bottom plate
27 Holding wall
27A Locking protruding portion
30 Lid portion
31 First hinge
32 First lid portion
33 Locking plate portion
33A Cut-out (locked portion)
34 Second hinge
35 Second lid portion

The invention claimed is:

1. A battery wiring module comprising:
   a plurality of connecting members that connect adjacent electrode terminals to each other;
   an external connection terminal that is configured to be connectable to another device;
   a resin protector comprising a plurality of first holding portions that hold the connecting members and a second holding portion that holds the external connection terminal, the second holding portion having an opening portion; and
   a lid portion that (i) covers the external connection terminal and (ii) is provided integrally with the resin protector via a first hinge, the lid portion comprising:
      a second hinge that comprises a hinge axis that is orthogonal to a hinge axis of the first hinge;
      a first lid portion formed by folding the first hinge; and
      a second lid portion that is formed by folding the second hinge and that is connected to the first lid portion via the second hinge,
   wherein:
   the first lid portion and the second lid portion are disposed in directions crossing each other,
   the second lid portion is configured to cover the opening portion of the second holding portion so that the external connection terminal is covered with the lid portion, and
   the second lid portion has a rectangular parallelepiped shape, and a front side, a lower side, and a right side thereof are entirely open.

2. The battery wiring module according to claim 1, wherein the resin protector is provided with a locking structure that holds the lid portion in a state in which the first hinge is folded.

3. The battery wiring module according to claim 1, wherein:
   the second holding portion is provided with a holding wall surrounding the external connection terminal, and
   the first lid portion is formed by folding the first hinge in a direction toward an outer side of the second holding portion and is configured to be locked on an outer side surface of the holding wall that is on the opposite side to the side of the external connection terminal.

4. The battery wiring module according to claim 2, wherein:
   the second holding portion is provided with a holding wall surrounding the external connection terminal, and
   the first lid portion is formed by folding the first hinge in a direction toward an outer side of the second holding portion and is configured to be locked on an outer side surface of the holding wall that is on the opposite side to the side of the external connection terminal.

5. The battery wiring module according to claim 1, wherein the battery wiring module is attached to a single cell group in which a plurality of single cells having cathode and anode electrode terminals are lined up.

6. The battery wiring module according to claim 1, wherein the resin protector is made from synthetic resin.

7. The battery wiring module according to claim 1, wherein the first hinge is connected to an edge portion of a bottom plate of the second holding portion.

8. The battery wiring module according to claim 1, wherein the first lid portion comprises:
   an oblong rectangular portion connected to the first hinge; and
   a locking plate portion that (i) is disposed perpendicularly with respect to the rectangular portion and (ii) has an L-shaped cut out defined therein that locks with a locking protruding portion disposed on a wall of the resin protector.

9. The battery wiring module according to claim 1, wherein the first lid portion is formed by folding the first hinge in a direction towards an inner side of the second holding portion.

* * * * *